(12) United States Patent
Van Spijk et al.

(10) Patent No.: US 6,652,399 B2
(45) Date of Patent: Nov. 25, 2003

(54) CONTINUOUSLY VARIABLE TRANSMISSION

(75) Inventors: Johannes Gerardus Ludovicus Maria Van Spijk, Drunen (NL); Hendrikus Adrianus Arnoldus Wilhelmina Pelders, Nuland (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 09/893,411

(22) Filed: Jun. 29, 2001

(65) Prior Publication Data

US 2002/0002089 A1 Jan. 3, 2002

(30) Foreign Application Priority Data

Jun. 30, 2000 (EP) .............................. 00202291

(51) Int. Cl.[7] .............................. F16H 63/00
(52) U.S. Cl. ........................... 474/28; 474/18
(58) Field of Search .............................. 474/18, 28, 29, 474/30, 35, 144

(56) References Cited

U.S. PATENT DOCUMENTS 4,483,687 A * 11/1984 Schlicker .................... 474/18
4,494,943 A     1/1985 Takei et al.
4,722,235 A *  2/1988 Kumazawa ................. 180/215
4,973,288 A * 11/1990 Sakakibara et al. ........... 474/12
5,006,092 A *  4/1991 Neuman et al. ............... 474/11
5,176,579 A *  1/1993 Ohsono et al. ................. 474/1
6,184,603 B1 * 2/2001 Hamai et al. .............. 180/65.2

FOREIGN PATENT DOCUMENTS

| EP | 0 373 490 | 6/1990 |
| EP | JP 03 014957 | 1/1991 |
| GB | 2 002 469 | 2/1979 |
| GB | 2 220 038 | 12/1989 |

* cited by examiner

Primary Examiner—William C Joyce
Assistant Examiner—Timothy McAnulty
(74) Attorney, Agent, or Firm—Young & Thompson

(57) ABSTRACT

A continuously variable transmission includes a set of pulleys mounted on respective pulley shafts (35, 36) and mounted with an endless transmission element for transmitting rotational movement from one pulley to the other, whereby the pulleys are incorporated in the transmission pre-mounted on an common support plate (22). The transmission thereby is provided with a favorable produced housing.

5 Claims, 1 Drawing Sheet

CONTINUOUSLY VARIABLE TRANSMISSION

BACKGROUND OF THE INVENTION

The current invention relates to a continuously variable transmission.

DESCRIPTION OF THE RELATED ART

Such a transmission is generally known, e.g. by EP-A-0.736.704. In the known construction the transmission is assembled from separable components including a primary pulley, a secondary pulley and a belt. Assembling a transmission with pre-settings assuring a correct alignment at a continuously variable transmission as e.g. described in EP-A-0.291.129, and as required for an optimal operation of the transmission, appears to be relatively difficult in common automotive assembly lines. This on the one hand is due to the assembly speed required and the precise mounting and individual calibration required for each transmission on the other hand.

SUMMARY OF THE INVENTION

It is an aim of the current invention to enhance assembly and commercialisation of continuously variable transmissions.

With a construction according to the invention, a belt/pulley assembly may be achieved which may be easily mounted in a transmission structure without compromising the quality of the belt/pulley assembly, and which may be assembled separately by dedicated equipment and personnel.

In a particularly favourable embodiment such assembly is provided with a circumferentially surrounding means fixed to the common support plate for the pulleys. In this way the axial building length may be kept minimal whereas freedom of mounting of elements functional for the operation of the belt/pulley assembly is maintained. The surrounding means protect the belt and pulley grooves from being easily damaged at mounting and during handling. A particular effective protection is achieved when the means extend over the axial positions of the belt. In a preferred embodiment the means are embodied by plate material more in particular synthetic plate material mounted to the supporting plate in a clipped (clamped) manner, so that an effective protection is achieved against in between falling parts like nuts, washers and contamination, while a light weight construction is maintained and while simultaneously an effective oil guiding means, easily adaptable in shape for each application is realised.

A further aspect of the invention reveals that the transmission and it's apparent method of assembly allows the application of a specific housing according to yet a further aspect of the invention showing a major part, solely completed by a lid part. Such a housing obviates internal hydraulic lines necessarily passing housing sections as commonly applied in known transmission assemblies, thereby obviating the necessity to apply hydraulic sealing means and minimising the risk of leakage and minimising the required amount of maintenance.

For instance in above connection a favourable embodiment of a transmission is thus attained if the assembly also carries a gear for meshing with an input gear as may be required by the application. The support plate is according to the invention favourably provided with an opening for carrying or receiving an intermediary shaft.

The support plate according to the invention may be produced as a housing part, preferably the lid part. In a specific embodiment as preferred according to the invention, the support plate is produced for being inserted into a transmission housing. According to the invention, the housing is produced with support means for receiving the support plate. In particular at least one such so called support means is provided as a so called a self loosing casting or plastic deformation rim, at least partly extending mainly parallel to the predominant direction of extension of the support plate, and transverse to the local housing walls.

BRIEF DESCRIPTION OF THE DRAWINGS

The invention will now be further explained by way of example in which.

DETAILED DESCRIPTION OF THE PREFERRED EMBODIMENTS

Figure 1:
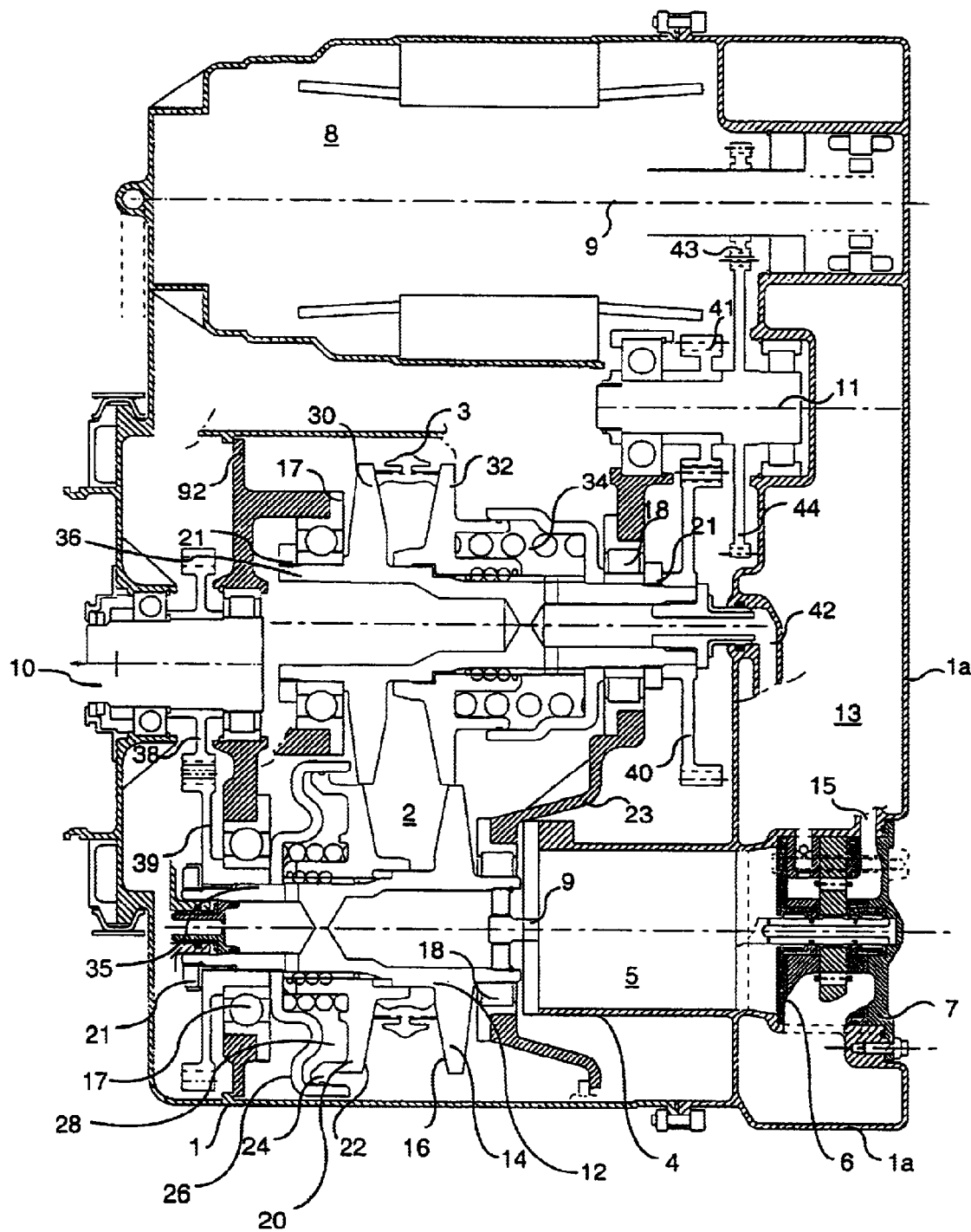
FIG. 1 is a schematic cross-section through a constant speed generator for use in an avionics environment.

The electric generator shown in FIG. 1 comprises a housing 1 which encloses a continuously variable transmission generally designated 2, utilising a belt/pulley drive known per se, a low pressure pump 4, a high pressure pump 6, a generator, generally designated 8, and an oil system disposed throughout the housing 1.

The transmission 2 utilises a metal belt 3 and enables the variable speed of an input shaft 10 which receives a drive from a spool of e.g. a gas turbine engine or a windmill to be converted to a near constant speed such that the generator 8 can be run at a near constant speed. In order to do this, a first shaft 35 of the belt drive mechanism carries a flange 14 which defines an inclined surface 16 against which a drive belt 3 bears. The shaft 35 also carries a coaxially disposed movable flange 20 drivingly connected to the shaft 35 via a splined portion (not shown). The movable flange 20 defines a further inclined surface 22 facing towards the surface 16, which surfaces serve to define a V-shaped channel whose width can be varied by changing the axial position of the flange 20 with respect to the fixed flange 14. The flange 20 has a circularly symmetric wall 24 extending towards and co-operating with a generally cup shaped element 26 carried on the shaft 35 to define a first hydraulic chamber 28 there between which is in fluid flow communication via a control duct (not shown) with an associated control valve. Similarly, a fixed flange 30 and a movable flange 32 are associated with a second shaft 36 and are associated with a second hydraulic control chamber 34. A steel segmented belt having a cross-section in the form of a trapezoid, with the outer most surface being wider than the inner most surface is used to interconnect the first and second variable ratio pulleys formed between the pairs of fixed movable flanges 14, 20; 30, 32, respectively, in order to drivingly connect the flanges 14, 20; 30, 32. The shaft 35 is in geared driving connection with the input shaft 10 via a step down gear, and the shaft 36 is connected to the generator 8 via a compound step up gear 40, 41, 43, 43.

The position of each movable flange 20; 32 with respect to the associated fixed flange 14; 30 is controlled by the hydraulic actuators formed by each movable flange 20; 32 and its associated hydraulic chambers 28, 34. Since the interconnecting belt 3 is of a fixed width, moving the flanges 14, 20; 30, 32 closer together forces the belt 3 to take a path of increased radial distance. The interconnecting belt 3 has a fixed length, and consequently as one movable flange 20; 32 is moved towards its associated fixed flange 14;30, the other movable flange 32; 20 must move away from its associated fixed flange 30; 14, in order for the path from an arbitrary starting point, around one of the pulleys, to the second pulley, around the second pulley and back to the fixed arbitrary starting point to remain a constant distance.

It is important in such a pulley system that the position of the flanges can be well controlled. It is also important that the compressive force exerted upon the belt can be well controlled since belt wear increases with compressive force, but belt slippage is damaging to both the belt and the pulleys. Thus a control system, an electric control unit (not shown) coordinating and controlling the hydraulic control means 28 and 34 and three hydraulic pumps (not shown) is provided for controlling both the drive ratio and the compressive load exerted on the belt, otherwise dented pinching force.

The assembly of a set of pulleys and a belt basically forming a continuously variable transmission, in the following the assembly of the first and second pulley, the structures defining hydraulic chambers 34 and 28, the bearings 17, 18, 19, the nuts 21 bolting together these elements on the respective pulley shafts 36, 35 and the belt 3 mounted between said pulleys will be generally denoted variator structure. In combination with said control means for controlling the transmission ratio varying function, in this case the electro-hydraulical control means the variator structure is denoted variator. The variator structure is mounted to a variator base plate 92, which is inserted into the housing 1 and fixed thereto, with the variator structure mounted thereon. According to the invention and as shown in the figure the base plate 92 is preferably fixed inside the housing 1 on a flange or otherwise protruding part thereof. To the axially opposite side the variator structure is supported by a second variator support plate 23, equally supporting the respected shafts to the 35 and 36 by bearings 18. At assembly of the transmission, the second support plate 23 preferably forms part of the variator structure mentioned before and is also mounted inside the transmission housing 1.

In a pre-assembled variator structure the bearings 17 applied in the supporting plate 92 are of a self-centring type, whereas at the other shaft end of each pulley a bearing 18 allowing axial play is applied. Preferably a pre-assembled structure is provided with a plate like protection member (not depicted) closely surrounding the pulleys circumferentially, so that the relatively vulnerable belt and pulley contacting faces are effectively protected by a light weight structure during handling and assembly of the entire transmission, while simultaneously a favourable and effective, easily adaptable oil guiding means is attained. In the embodiment according to the invention the surrounding means is produced as a one piece, circumferentially non-endless part, which produced, whereas the plate 92 is produced with clamping or clip means for receiving the surrounding means, thus realising a mounting without the requirement of further fixing means. The plate 92, in a preferred embodiment is radially stretched to an extend generally conforming to the radial circumference of the variator structure. In this embodiment it is produced with ear parts connecting to the housing 1.

Both support plates 92 and 23 are provided with an opening for supporting an intermediary shaft, input shaft 10, and intermediary and transmission output shaft 11 respectively. The housing 1 supports shaft 11 to its opposite side. The transmission input shaft 10 carries a gear wheel 38 meshing in a speed reducing manner with a gear wheel 39 mounted to the shaft 35 and located on the opposite side of support plate 92 relative to the pulley assembly. In the depicted embodiment the gear 39 is favourably mounted to the shaft 35 by a flange part supporting the bearing 17 of the first shaft 35. In this manner both an axially short build variator part, and a circumferentially relatively large bearing capable of reliably receiving large forces is achieved. In a comparable manner to the counter side of the second variator support plate 23 a gear 40 is mounted to the shaft 36 meshing with gear 44 on intermediary shaft 11.

The housing 1 is favourably provided with a first major part and a lid part 1a. The major part contains all of the variator structure and of the generator 8, whereas the lid part closes the variator section of the housing, merely providing a hydraulic access opening 42 and, contains support parts for the intermediary shaft 11 and the generator shaft 9. The housing of the transmission 2 has the particular advantage that no hydraulic leads need to pass housing sections as practised in common CVT designs, thereby avoiding the need for specific liquid tight sealing.

The lid part of the current embodiment is produced with a bay structure 5, coaxially linking up with the primary shaft 35. Bay 5 is produced for receiving several pumps disposed aside one another with, a common drive shaft connected to the primary drive via shaft part 9. The bay 5 is produced with a separate lid part 7, allowing easy access and removal in case of failure of a pump. In the current embodiment the highest-pressure pump 6 is located closest to the lid 7. Bay 5 connects to a separated oil bay 13 via a hydraulic opening 15.

By above measures, either per se and particular in combination, a favourable transmission is achieved which is applied as a constant frequency electric generator, which is in particular suited for aeronautical application.

What is claimed is:

1. Continuously variable transmission comprising a set of pulleys mounted on respective pulley shafts (35, 36) and mounted with an endless transmission element (3) for transmitting rotational movement from one pulley to the other, characterised in that the pulleys are incorporated in the transmission mounted on a common support plate (92);

a primary shaft (10) is provided with a gear wheel (38) meshing with an input gear (39); and the gear wheel (38) is provided to the side of the support plate opposite of the side thereof, where the pulley is mounted.

2. Continuously variable transmission according to claim 1, characterised in that the transmission is supported by a second support plate (23) supporting two transmission shafts (35, 36).

3. Continuously variable transmission according to claim 1, characterised in that the transmission (2) is enclosed and mounted fixedly to the transmission housing.

4. Continuously variable transmission according to claim 3, characterised in that the housing is provided with openings for bearing an input shaft (10) and/or an output shaft (11).

5. Continuously variable transmission, according to claim 1, characterised in that the housing (1, 1a) consists of a first and a second part, one of which circumferentially surrounds the transmission (2) over it's full axial width and at one axial end, whereas the other part forms a lid to said major housing part, preferably produced with supporting parts for supporting at least one shaft (35, 36, 11) of the transmission (2).

* * * * *